US 8,589,258 B2

(12) United States Patent
Smith

(10) Patent No.: US 8,589,258 B2
(45) Date of Patent: Nov. 19, 2013

(54) DECLINING BALANCE FINANCIAL CALCULATION WITH NO REMAINDER

(75) Inventor: Howard Smith, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/531,750

(22) Filed: Sep. 14, 2006

(65) Prior Publication Data
US 2008/0071652 A1    Mar. 20, 2008

(51) Int. Cl.
*G07B 17/00* (2006.01)
*G07F 19/00* (2006.01)
*G06F 7/52* (2006.01)
*G06F 13/00* (2006.01)

(52) U.S. Cl.
USPC ............ 705/30; 708/103; 708/650; 708/651; 708/680

(58) Field of Classification Search
None
See application file for complete search history.

(56) References Cited

U.S. PATENT DOCUMENTS

| 4,128,758 | A | * | 12/1978 | Bukowski et al. ............ 705/400 |
| 4,562,553 | A | | 12/1985 | Mattedi et al. |
| 5,046,038 | A | | 9/1991 | Briggs et al. |
| 5,511,016 | A | | 4/1996 | Bechade |
| 5,548,544 | A | | 8/1996 | Matheny et al. |
| 5,568,412 | A | | 10/1996 | Han et al. |
| 5,764,555 | A | | 6/1998 | McPherson et al. |
| 6,879,992 | B2 | | 4/2005 | Zohar et al. |
| 6,978,289 | B1 | | 12/2005 | Matula |
| 7,035,892 | B2 | | 4/2006 | Denk et al. |
| 2004/0128338 | A1 | | 7/2004 | Even et al. |
| 2012/0011185 | A1 | * | 1/2012 | Mohamed et al. ............ 708/497 |

OTHER PUBLICATIONS

Fowler, Martin "Quantity" (http://martinfowler.com/ap2/quantity.html ), Dec. 7, 2000 (as provided by Internet Archive).*
Gay, David M., "Correctly Rounded Binary-Decimal and Decimal-Binary Conversions," AT&T Bell Laboratories, Nov. 30, 1990, http://www.huygens.org/cm/cs/what/ampl/REFS/rounding.pdf.
Clinger, William D., "How to Read Floating Point Numbers Accurately," ACM, 1990, http://delivery.acm.org/10.1145/100000/93557/p92-clinger.pdf?key1=93557&key2=3042440511&coll=GUIDE&dl=GUIDE&CFID=78591870&CFTOKEN=74695179.

* cited by examiner

*Primary Examiner* — Asfand Sheikh
(74) *Attorney, Agent, or Firm* — Hope Baldauff, LLC

(57) ABSTRACT

An amount is divided into equal portions (n) in a manner which eliminates rounding errors or remainders and has repeatable results.

6 Claims, 4 Drawing Sheets

DECLINING BALANCE FINANCIAL CALCULATION WITH NO REMAINDER

BACKGROUND

Financial calculations pose a unique challenge when attempted using values that are not equally divisible. When such a value is divided by an amount into portions, and either rounded or truncated, the portions, when added back together, are either greater than or less than the original value. Thus, a balance, or remainder, is created. The most often employed measure to address the balance is to compare (in code) the new total to the original amount and to adjust one of the portions for the rounding error. This often leads to issues as to which portion should be adjusted. Further, the results of these calculations are inconsistent and unrepeatable unless the same portion is adjusted each time.

SUMMARY

An amount is divided into equal portions (n) in a manner which eliminates rounding errors, or remainders. The amount may be any type of number. When the amount is divided into (n) portions, it produces a quotient. The quotient is stored as a distinct entry in the memory and then subtracted from the amount to determine a subtotal. The subtotal is then stored as a distinct entry in the memory. The portions (n) are decremented by 1. If (n) is less than 2, the method may be stopped. If (n) is greater than or equal to 2, the method may be repeated, replacing the amount with the stored subtotal. Upon completion of the method, the quotients, when added together, will equal the original amount exactly. If the process is repeated using the same values and the same method of adjusting for significant digits (truncation or rounding, for example), the results will be consistent. Therefore, rounding errors and remainders are eliminated and accuracy is improved.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
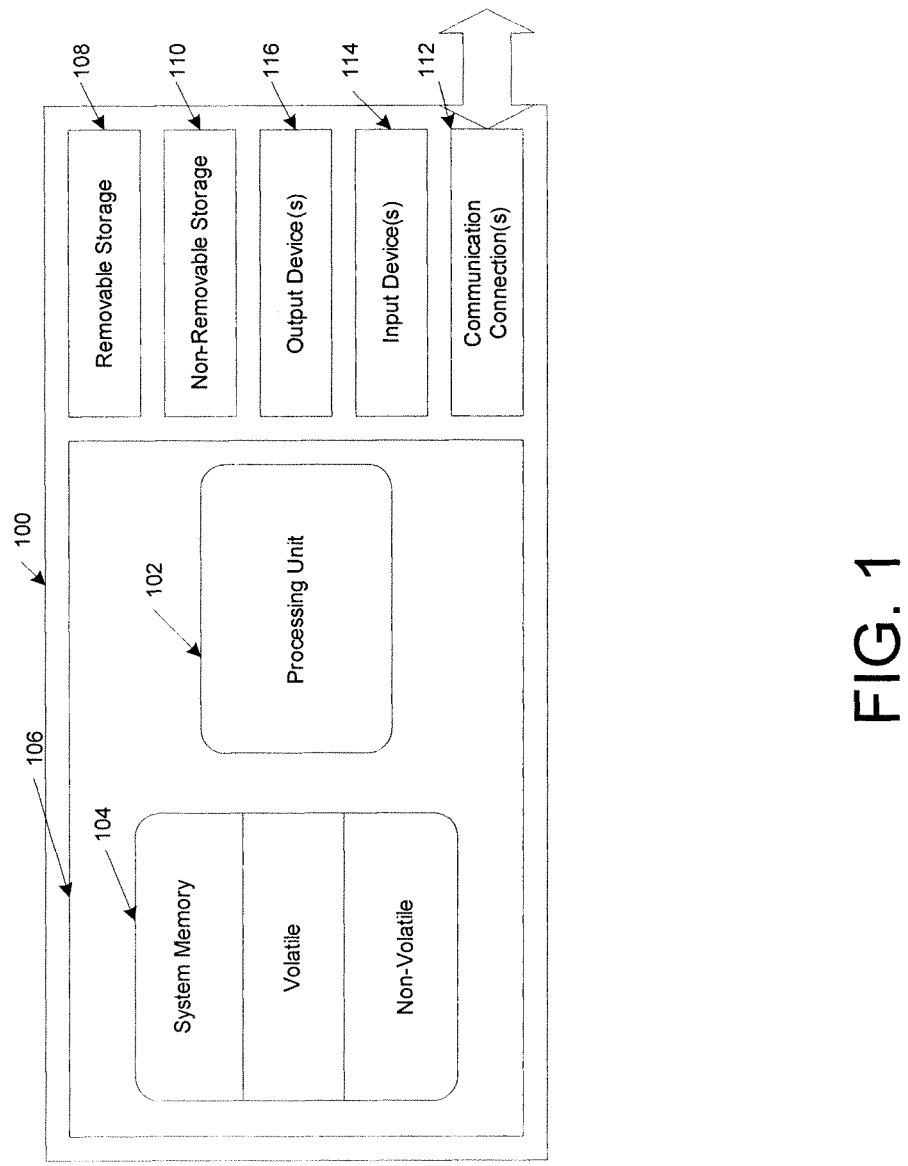
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
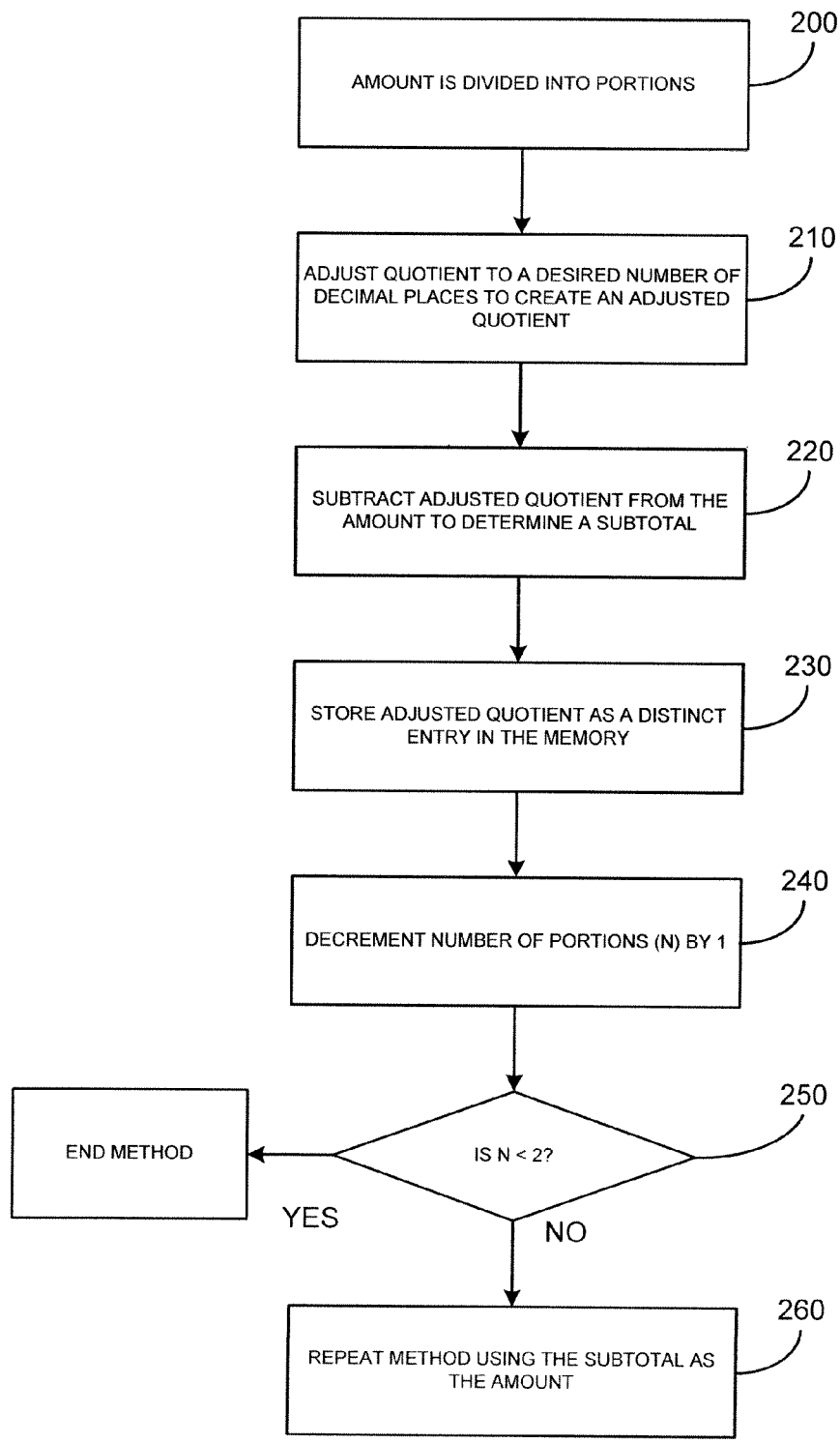
FIG. 2 is a flowchart of a method in accordance with the claims.

FIG. 2 may illustrate a method of financial calculation for dividing an amount into substantially equal portions where the substantially equal portions sum to the amount. The method may be executed by a computer such as the computer described in FIG. 1. The method may be useful in a variety of financial calculations where truncation or rounding may result in the portions not summing perfectly to the amount. For example, in calculating depreciation amounts, it is important that the payments sum to the original amount to be depreciated and rounding or truncation may result in assets not being completely depreciated. Specifically, an asset valued at $100 that is to be depreciated over three years using straight line depreciation would result in the asset being depreciated by $33.33 per year. However, at the end of year three, this would leave $0.01 left as the value of the asset. It would be useful to have a method to address this problem and eliminate the leftover $0.01 in a predictable and repeatable manner.

At block 200, the amount may be divided into portions (n) to result in a quotient. Using the previous example of depreciating the $100 asset over three years using substantially equal portions, the amount may be $100 and the portions (n) may be three years. The amount may be any type of number. It does not have to be an integer or a dollar amount but can be any number. Similarly, the portions (n) are not limited to integers. While the method may be especially useful for financial calculations, it can be applied to a variety of situations.

At block 210, the quotient may be adjusted to a desired number of decimal places to create an adjusted quotient. For financial calculations, it may be useful to adjust to two decimal places. The adjustment may occur in a variety of ways. In one embodiment, the adjustment may be accomplished via truncation and in another embodiment, the adjustment may be accomplished via rounding. The exact method of adjustment may be accomplished in a variety of manners. However, it may be useful to use the same adjustment methodology to ensure repeatability and consistency of results. The number of significant digits used in the calculations may be the same for all calculations. If the number of significant digits used varies, the method may still result in a number of substantially equal portions, but it may not be as precise as desired.

At block 220, the adjusted quotient may be subtracted from the amount to determine a subtotal. Using the previous example of depreciating the $100 asset over three years using substantially equal portions, the subtotal may be the remaining value of the asset. The subtotal may be an exact measure of the remaining value of the asset.

Also, using the previous example of calculating a payment schedule of substantially level payments for a loan, the subtotal may be the remaining balance of the loan. If the borrower sent in a payment in the amount of the subtotal, the loan may be paid-in-full.

At block 230, the adjusted quotient may be stored as a distinct entry in the memory. The adjusted quotient may be any number of desired decimal places. Using the previous example of depreciating assets, the adjusted quotient may be the amount of depreciation in any given time period. Using the example of calculating a payment schedule for a loan, the adjusted quotient may be the payment amount. In the same example, the adjusted quotient may be stored as a distinct entry to be called upon at a later date to produce a payment summary/record.

At block 240, the number of portions (n) may be decremented by 1. Using the previous example of calculating a payment schedule of substantially level payments for a loan, the number of portions (n) may be the amount of payments desired to satisfy the loan. As a payment is made, the amount of remaining payments required is decremented by 1. The payments may be broken into virtually any (n) value, allowing for a variety of payment schedules.

At block 250, if (n<2), the subtotal may be stored as a distinct entry in the memory and the method may be stopped. If (n<2) then the amount has been broken into the desired number of substantially equal portions (n) with the remainder being zero.

In another aspect, if the subtotal minus the adjusted quotient is 0, the method may be stopped. Again, this may be another indication that the amount has been broken into the desired number of portions (n) with the remainder being zero.

At block 260, the method may be repeated using the subtotal as the amount. Following the previously described blocks, the adjusted quotient will be stored and the subtotal will then be split into a number of portions using n reduced by 1 from block 240.

Figure 3:
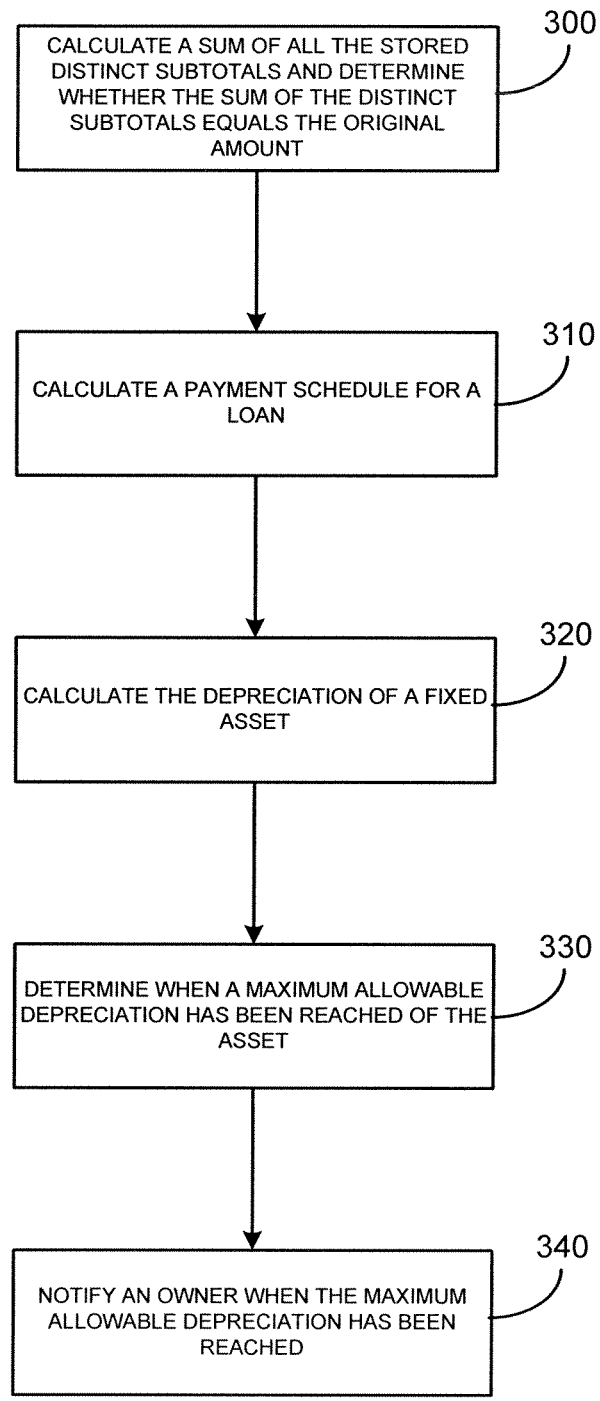
FIG. 3 is another flowchart illustrating additional blocks of a method in accordance with the claims.

FIG. 3 may illustrate some additional aspects of the method. At block 300, the method may calculate a sum of all of the stored distinct subtotals and the method may determine whether the sum of the distinct subtotals equals the original amount. This block may be used as a check that the method is operating properly. If the check fails, a flag may be set to inform interested parties that there is a problem with the method.

At block 310, the method may calculate a substantially level payment schedule for a loan. More specifically, the amount may be an initial balance owed, the portions may be the number of payments and the distinct stored entries in the memory may be payment amounts. By using the described blocks, there will be no residual amount and the loan will be paid down to exactly 0.

At block 320, the method may calculate the depreciation of a fixed asset. More specifically, the amount may be the value of the asset to be depreciated, the portions may be the amount of periods over which the asset is to be depreciated and the distinct stored entries in the memory may be depreciation amounts. By using the described blocks, the asset may be completely depreciated to 0 without any residual.

At block 330, the method may determine when a maximum allowable depreciation has been reached of the asset. Depreciation may be a function of tax codes and tax codes change often. In some economic systems, purchasers of equipment are allowed to quickly depreciate assets to spur the purchase of more equipment. However, care must be taken to not depreciate the asset beyond its original purchase value. Related, at block 340, the method may notify an owner when the maximum allowable depreciation has been reached. The notification may be an email, a visual display or any other appropriate form of communication.

Figure 4:
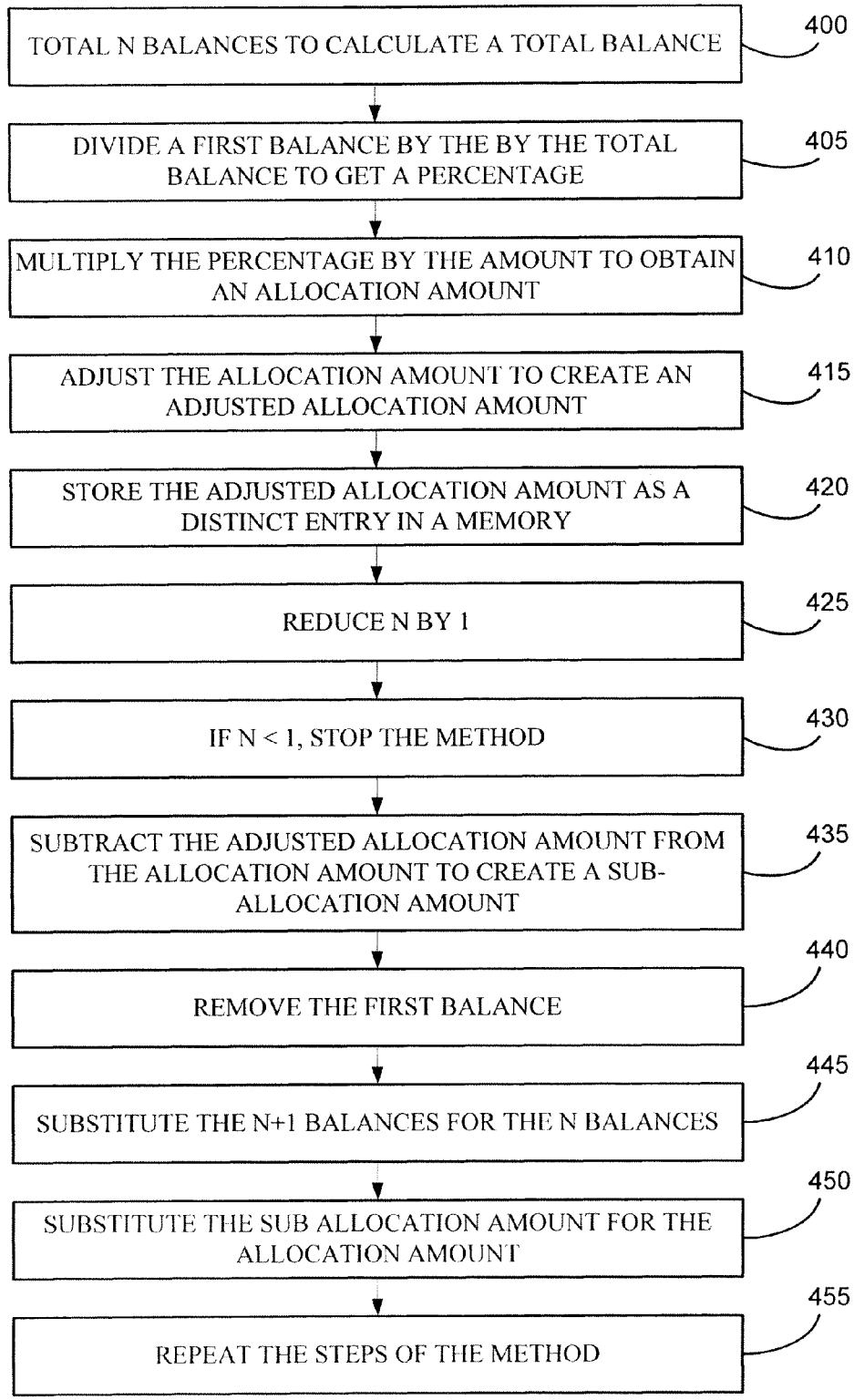
FIG. 4 is a flowchart illustrating another embodiment of a method in accordance with the claims.

In another embodiment, the same concept may be used to allocate an amount over a number of balances, such as allocating an amount of tax over a purchase of several items without have a remainder. FIG. 4 may be an illustration of such a method. At block 400, the method may total n balances to calculate a total balance. N may be an integer or any type of number. At block 405, a first balance may be divided by the by the total balance from block 400 to get a percentage. In other words, step 405 is determining the percentage the first balance is of the total balance. At block 410, the percentage from block 405 may be multiplied by the amount to be allocated to obtain an allocation amount.

At block 415, the allocation amount may be adjusted to create an adjusted allocation amount. As previously described, for financial calculations, it may be useful to adjust to two decimal places. The adjustment may occur in a variety of ways. In one embodiment, the adjustment may be accomplished via truncation and in another embodiment, the adjustment may be accomplished via rounding. The exact method of adjustment may be accomplished in a variety of manners. However, it may be useful to use the same adjustment methodology to ensure repeatability and consistency of results. The number of significant digits used in the calculations may be the same for all calculations. If the number of significant digits used varies, the method may still result in a number of substantially equal portions, but it may not be as precise as desired.

At block 420, the adjusted allocation amount may be stored in a memory as a distinct entry. Eventually, once the method ends, the distinct entries may be the adjusted allocation amounts. At block 425, n may be reduced by 1 and at block 430, if n<1, the method may be stopped as the amount has been fully allocated. If n is not less than 1, then the amount has not been fully allocated and the method continues.

At block 430, the first balance may be subtracted from the total balance to create a sub-balance. At block 435, the adjusted allocation amount may be subtracted from the allocation amount to create a sub-allocation amount. At block 440, the first balance may be removed and at block 445, the n+1 balances may be substituted for the n balances. In other words, after the first balance is removed, the second balance will be substituted for the first balance, the third balance will be substituted for the second balance, the fourth balance may be substituted for the third balance, etc. At block 450, the sub allocation amount may be substituted for the allocation amount and at block 455, the method may be repeated.

Walking through an example, say an amount of $763.33 in tax needs to be allocated over a purchase of $10,000 that was made up of three items, one costing $2,000, a second costing $3,000 and a third costing $5,000. In a traditional approach, the following steps may be taken:
(2,000/10,000)*763.33=152.67
(3,000/10,000)*763.33=229.00
(5,000/10,000)*763.33=381.67
The total allocated is 763.34 (152.67+229.00+381.67=763.34) which does not equal the desired 763.33.

The method described in FIG. 4 would operate as follows:
N=3
2,000/10,000=0.2
0.2*763.33=152.6666
152.66 is rounded to 152.67 and stored
N is reduced to 2 which is not less than 1, so the method continues
10,000−2,000=8,000 (sub balance)
763.33−152.67=610.66 (sub allocation amount, substituted for allocation amount)
2,000 is removed (first amount)
3,000 is the new first amount (from second)
5,000 is the new second amount (from third)
Method begins again
3,000/8,000=0.325
0.325*610.66=228.9975
228.9975 is rounded to 229.00 and stored
N is reduce to 1 which is not less than 1, so the method continues
8,000−3,000=5,000 (sub balance)
610.66−229.00=381.66 (sub allocation amount, substituted for allocation amount)
3,000 is removed (first amount)
5,000 is the new first amount
Method begins again
5,000/5,000=1.0
1.0*381.66=381.66
381.66 is rounded to 381.66 and stored
N is reduced to 0, so method stops.

In the memory are stored three distinct entries (152.67; 229.00; and 381.66) which are the amounts to be allocated to the $2,000 item, the $3,000 item and the $5,000 item respectively. The amounts to be allocated total exactly to the amount to be allocated, 763.33.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer system comprising a processor, a memory and an input output device wherein the memory stores computer executable instructions and the processor is adapted to execute computer executable instructions for dividing an amount, the computer executable instructions comprising:

identifying a plurality of partial balances, a sum of the plurality of partial balances equals a total balance;

setting a variable n equal to a quantity of the plurality of partial balances;

setting a temporary partial balance equal to a first partial balance in the plurality of partial balances;

setting a temporary total balance equal to the total balance;

setting a temporary amount equal to the amount;

(a) determining a ratio by dividing the partial balance by the temporary total balance;

(b) determining an allocation by multiplying the ratio and the temporary amount;

(c) adjusting the allocation to a desired number of decimal places;

(d) storing the adjusted allocation in the memory;

(e) upon performing operations (a)-(d), decrementing the variable n by one, setting the temporary partial balance equal to another partial balance in the plurality of partial balances, updating the temporary total balance by subtracting the first partial balance from the temporary total balance, and updating the temporary amount by subtracting the adjusted allocation from the temporary amount; and repeating operations (a)-(e) until the variable n is less than one, wherein dividing the amount into portions relative to each of the plurality of partial balances results in the portions not summing to the amount, and wherein summing the adjusted allocations determined in operation (c) after repeating operations (a)-(e) until the variable n is less than one results in the amount.

2. The computer system of claim 1, wherein adjusting the allocation to the desired number of decimal places further comprises one of the group comprising rounding the allocation or truncating the allocation.

3. The computer system of claim 1, wherein repeating the operations (a)-(e) until the variable n is less than one further comprises repeating the operations (a)-(e) until the temporary amount is zero after subtracting the adjusted allocation from the temporary amount.

4. The computer system of claim 1, further comprising calculating a sum of all the distinct stored adjusted allocations and determining whether the sum of the stored adjusted allocations equals the amount.

5. A computer-implemented method for dividing an amount, the method comprising computer-implemented operations for:

identifying, by a computer having a processor and a memory, a plurality of partial balances, a sum of the plurality of partial balances equals a total balance;

setting, by the computer, a variable n equal to a quantity of the plurality of partial balances;

setting, by the computer, a temporary partial balance equal to a first partial balance in the plurality of partial balances;

setting, by the computer, a temporary total balance equal to the total balance;

setting, by the computer, a temporary amount equal to the amount;

(a) determining, by the computer, a ratio by dividing the partial balance by the temporary total balance;

(b) determining, by the computer, an allocation by multiplying the ratio and the temporary amount;

(c) adjusting, by the computer, the allocation to a desired number of decimal places by rounding or truncating the allocation at the desired number of decimal places;

(d) storing, by the computer, the adjusted allocation in the memory;

(e) upon performing operations (a)-(d), decrementing, by the computer, the variable n by one, setting, by the computer, the temporary partial balance equal to another partial balance in the plurality of partial balances, updating, by the computer, the temporary total balance by subtracting the first partial balance from the temporary total balance, and updating, by the computer, the temporary amount by subtracting adjusted allocation from the temporary amount; and repeating operations (a)-(e) until the variable n is less than one, wherein dividing the amount into portions relative to each of the plurality of partial balances results in the portions not summing to the amount, and wherein summing the adjusted allocations determined in operation (c) after repeating operations (a)-(e) until the variable n is less than one results in the amount.

6. The computer-implemented method of claim 5, wherein the plurality of partial balances comprises individual purchase amounts; and wherein the amount comprises a tax on the total balance.

* * * * *